June 28, 1966   E. DELETAILLE   3,257,740
INSTRUCTIVE APPARATUS FOR STUDYING THE AUTOMATION
OF A SEQUENCE OF MOVEMENTS
Filed Dec. 29, 1964   10 Sheets-Sheet 1

June 28, 1966  E. DELETAILLE  3,257,740
INSTRUCTIVE APPARATUS FOR STUDYING THE AUTOMATION
OF A SEQUENCE OF MOVEMENTS
Filed Dec. 29, 1964  10 Sheets-Sheet 4

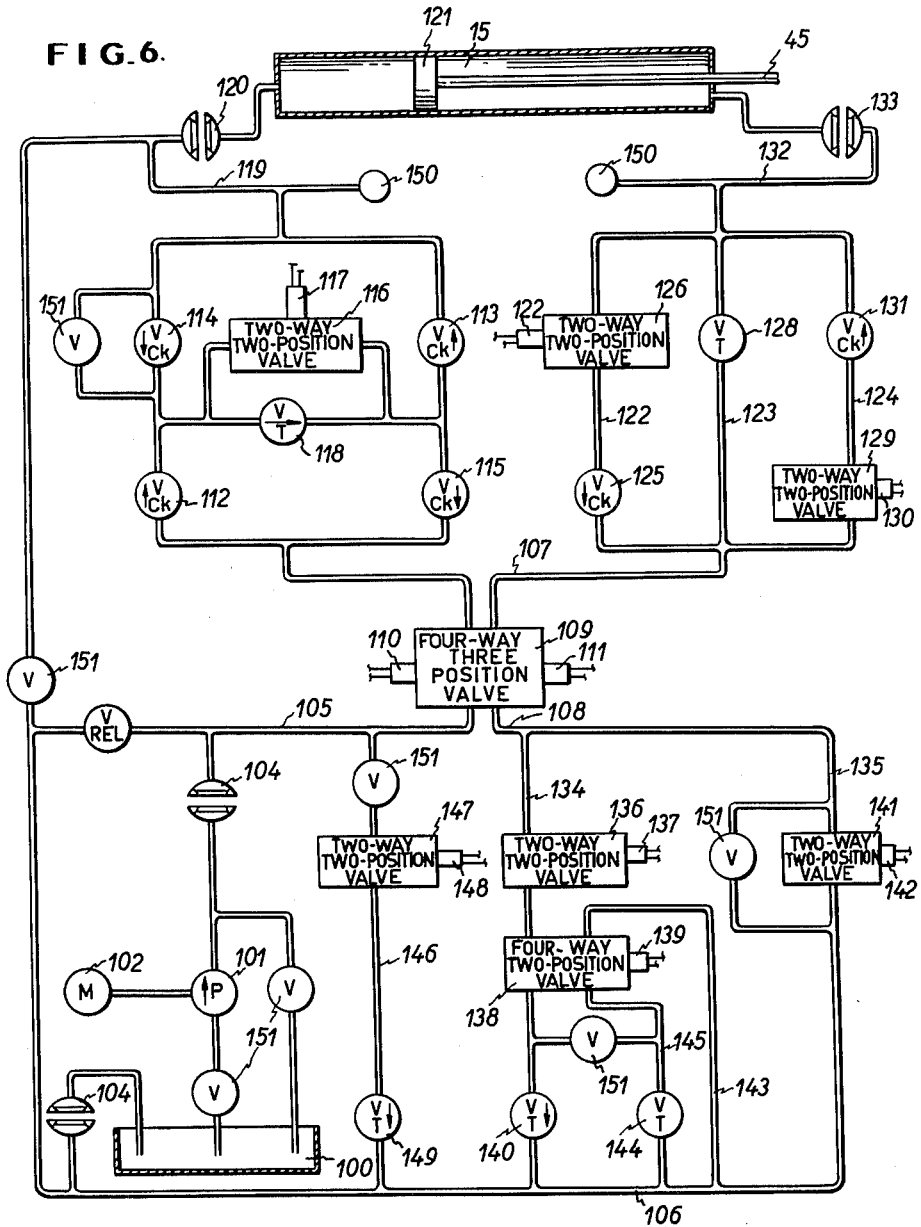

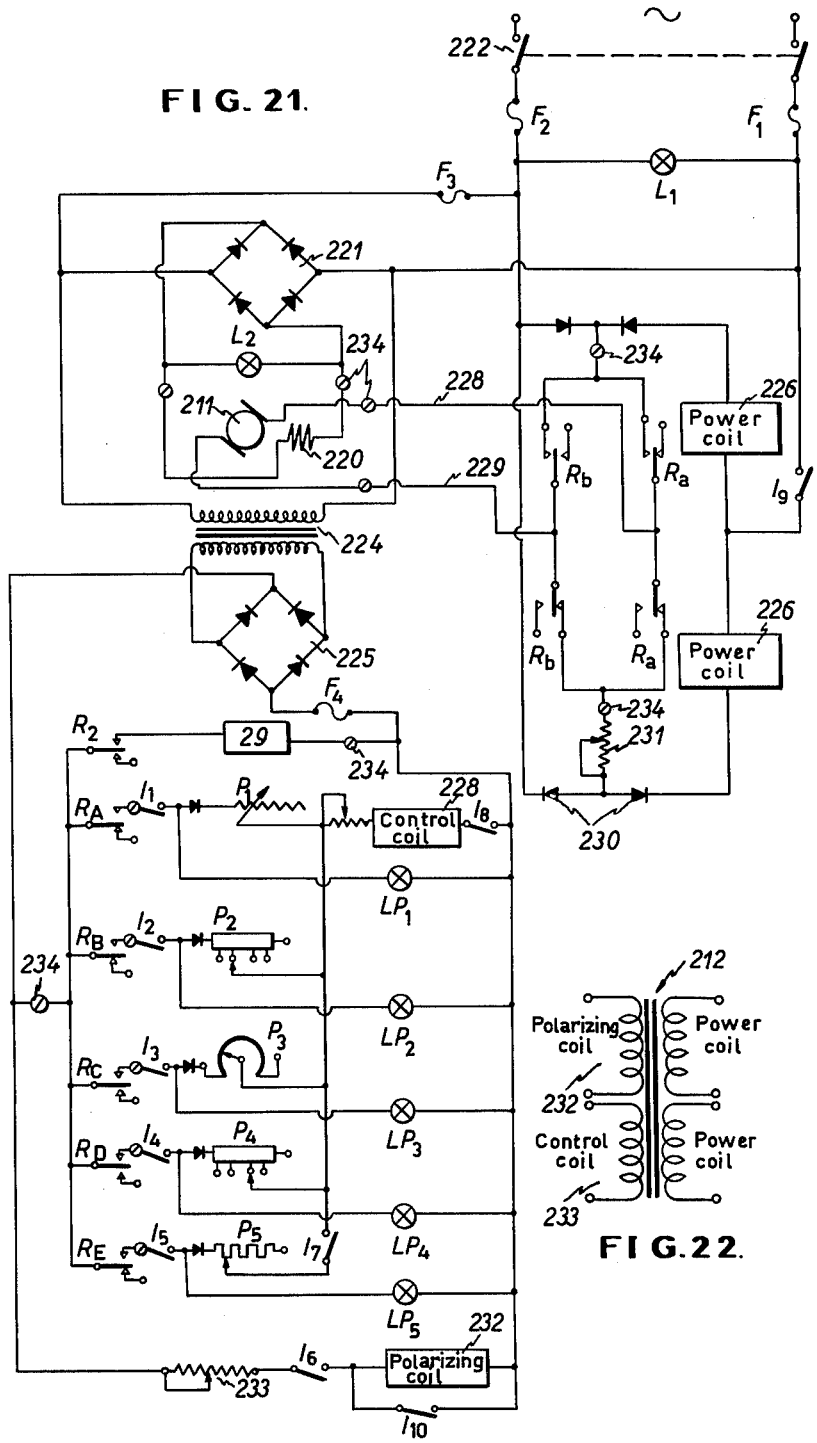

United States Patent Office 3,257,740
Patented June 28, 1966

3,257,740
INSTRUCTIVE APPARATUS FOR STUDYING THE AUTOMATION OF A SEQUENCE OF MOVEMENTS
Emile Deletaille, 20 Ave. Theo Van Pe, Brussels 16, Belgium
Filed Dec. 29, 1964, Ser. No. 421,873
Claims priority, application Netherlands, Mar. 19, 1962, 276,087; Feb. 22, 1963, 289,318
6 Claims. (Cl. 35—13)

This application is a continuation-in-part of application Serial No. 263,506 filed on March 7, 1963, entitled, "Instructive Apparatus for Studying the Automation of a Sequence of Movements", now abandoned.

This invention relates to an instructional apparatus for studying the automation of a sequence of movements of a member.

Because of present and future developments of automation, it is necessary to have specially trained personnel available, because automation makes use of various techniques, such as electricity, electronics, mechanics, pneumatics, and hydraulics, selecting for each task the most suitable technique and within that technique the method of operation capable of executing the work in question as efficiently as possible.

Practical teaching of automation in each of the basic techniques has been hampered by the lack of instructional material suitable for the purpose in question. It is not possible to envisage the use of the various types of industrial equipment already existing in the various techniques, because of the multiplicity of such apparatus and the fact that each permits only a minimum number of movements or operations to be performed. On the contrary, it is necessary that each of the elementary automations, i.e., translation and rotation, should be able to be tried out in the various techniques and their variations, using only a minimum of apparatus and possibly even a single apparatus equipped with accessories which are interchangeable according to the particular technique to be applied. It must, however, be possible to design the elementary movements in any desired manner so as to illustrate the sequence of operations carried out on industrial machines. Finally, it is necessary that the apparatus envisaged should be sufficiently economical in price to permit their use for teaching purposes.

The automation of a movement or a sequence of movements entails the fixing of a certain number of elements. Thus for example a simple movement of translation comprises three components: the direction of the movement, its speed, and the path to be travelled. Each of these components can be organized according to different techniques, and in turn each of these techniques embraces certain alternatives which are imposed either by the conditions of the problem or by the equipment available. It will thus be realized that each problem of automation, even the simplest, can be solved by a large number of processes.

Complete practical teaching of automation should introduce the pupil to all these technical possibilities or at least a large number of them.

The invention accordingly has the object of providing for educational purposes an instructional apparatus complying as closely as possible with the requirements indicated above.

According to the invention an instructional apparatus for studying the automation of a sequence of movements of a member comprises driving means for said member, a support chosen through a series of supports each one corresponding to one technical field (hydraulic, mechanic, pneumatic, electrical, electronical), a plurality of operating circuits on said support, operating means in said operating circuits for controlling the speed and the direction of movements of said driving means, control circuits for said operating means, a selector having a series of groups of selecting means to be operated by the pupil, means responsive to said selective means in said control circuits, an element accompanying the movement of said driven member, a series of stop means to be adjusted by the pupil for controlling the driving periods of said driving means, provided on said element, instruction means to be actuated by said stop means, means responsive to said instruction means in said control circuits whereby upon actuating of an instruction means by said stop means, one control circuit is open and a following control circuit, which is preselected by said selecting means, is closed, and visually display indicating means accompanying the movement of said driven member.

In one embodiment, the apparatus comprises a frame, a support chosen through a series of supports each one corresponding to one technical field (hydraulic, mechanic, pneumatic, electrical, electronical), a plurality of operating circuits on said support, operating means in said operating circuits for controlling the speed and the direction of movements of said driving means, control circuits for said operating means, means for securing removably said support in said frame, a selector mounted in said frame, said selector having a series of groups of selecting means to be operated by the pupil, means responsive to said selective means in said control circuits, a transmitter, means for securing removably said transmitter to said frame, said transmitter having said driving means for said member secured thereto, an element accompanying the movement of the mobile part of said driving means provided in said transmitter, a series of stop means to be adjusted by the pupil for controlling the driving periods of said driving means, provided on said element, instruction means to be actuated by said stop means, means responsive to said instruction means in said control circuits whereby upon actuating of an instruction means by said stop means, one control circuit is open and a following control circuit, which is preselected by selecting means, is closed, and visual display indicating means accompanying the movement of said driven member.

According to one particular embodiment, all the parts of the apparatus comprise means permitting the creation of breakdowns or preventing the operation of all or part of the operating circuits, the pupil being required to locate the breakdown or breakdowns by reasoning, particularly by examining the visual display means.

Other details and features of the invention will become clear from the description given below by way of example and with reference to the accompanying drawings.

FIGURE 6 is a scheme of the operating circuits mounted on the panel corresponding to the hydraulic field.

FIGURE 21 is a scheme of the operating circuits mounted on the panel corresponding to the electrical field and of a part of selection electrical circuits connected thereto.

FIGURE 22 is an electrical scheme of the magnetic amplifier shown in FIG. 21.

In various figures, the same reference numbers refer to identical or similar parts.

Figure 1:
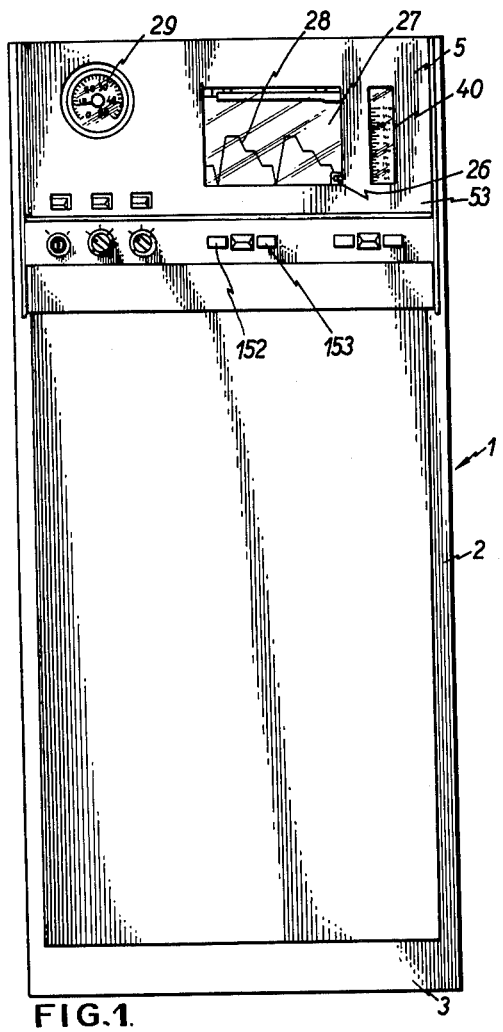
FIGURE 1 is an elevation view of the front of an instructional apparatus according to the invention.

It will be understood that the apparatus according to the invention and its accessories can comprise means permitting the execution of rectilinear movements, curvilinear movements, rotary movements, and/or combinations of these movements, in such a manner as to effect in fact any type of movement. For clarity, however, the explanations given with reference to the drawings, will relate only to rectilinear movements.

The apparatus comprises a frame 1 represented in the drawings by four uprights 2 and a base 3, said frame supporting at the front a visual display means 5 and on the inside a support 4. A support of this type is constituted, as illustrated, by a panel carrying a number of operating circuits of a chosen technique.

Because of the five basic techniques which must be able to be studied and utilised by the pupil, the apparatus according to the invention can be conceived in two different forms: either an apparatus is provided which comprises five interchangeable panels 4, that is to say one support for each basic technique, or else five individual apparatuses according to the invention can be provided, each of them comprising one fixed panel relating to one of the basic techniques. The output or instruction means which will be referred to below will also be interchangeable or fixed in a similar manner to the panels 4.

Figure 2:
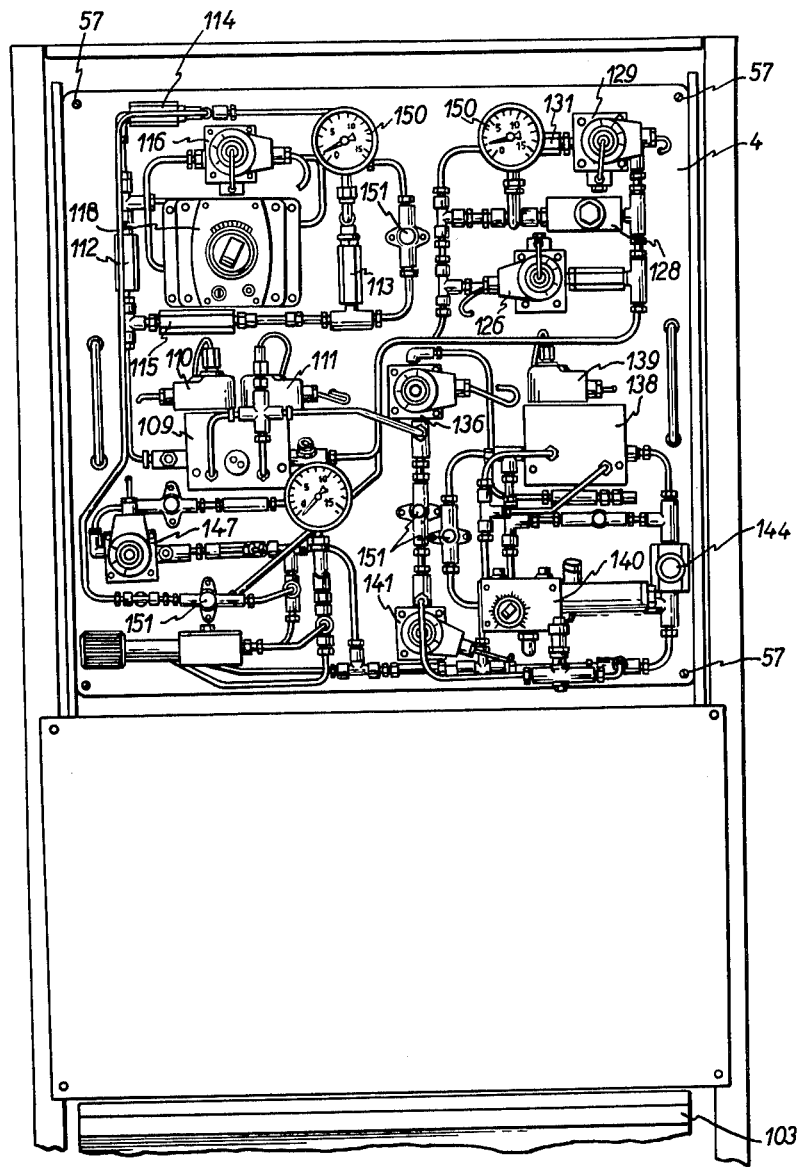
FIGURE 2 is an elevation view on an enlarged scale, of the upper back part of the apparatus according to FIG. 1, provided with a panel corresponding to the hydraulic technical field.

In FIGURE 2 a removable panel 4, secured by screws 57, has been shown which comprises various accessories forming hydraulic operating circuits.

Figure 7:
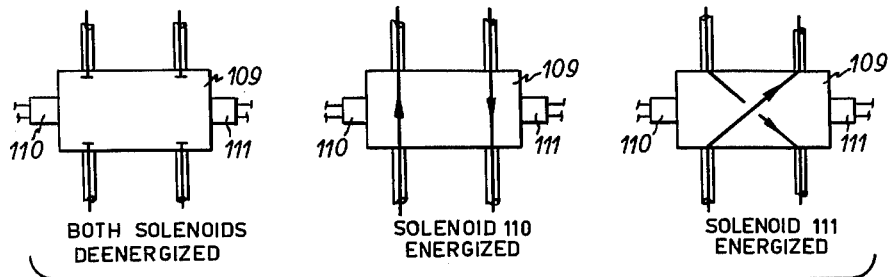
FIGURES 7 to 10 illustrate schematically the operating positions of valves shown in FIG. 6.

Considering FIG. 2 and the corresponding diagrams in FIGS. 6 to 10, the hydraulic operating circuits comprise a first unit comprised of a tank 100, a pump 101 driven by a motor 102. This unit is arranged inside a drawer 103 of the frame 1 and it is connected by connectors 104 to hydraulic lines 105, 106 of the hydraulic network which is attached to the panel 4. This network comprises a valve with four ways 105 to 108 and three positions 109, which is controlled by two solenoids 110, 111. The connections between these ways 105 to 108 according to energizing of the solenoids 110, 111 is shown in FIG. 7.

The pipe 106 is connected to a pipe 119 through a hydraulic bridge that comprises four check valves, a two-way two-position valve 116 controlled by a solenoid 117 and a pressure-regulating valve 118. Said pipe 119 is connected through a connection 120 to the inlet to a cylinder 15 which is located, as shown hereinafter, in another part of the apparatus and the piston 121 of which comprises the member the movements of which must be studied by the pupil.

The pipe 107 is connected to a pipe 132 through three parallel pipes 122 to 124 that include respectively a check valve 125 a two-way two-position valve 126 controlled by a solenoid 127; a pressure-regulating valve 128, a two-way two-position valve 129 controlled by a solenoid 130 and a check valve 131. Said pipe 132 is connected through a connection 133 to the outlet of the cylinder 121.

The pipe 108 is connected to the pipe 106 through two parallel pipes 134, 135 that include respectively a two-way two-position valve 136 controlled by a solenoid 137, a four-way four-position valve 138 controlled by a solenoid 139, a pressure-regulating valve 140 and a two-way two-position valve 141 controlled by a solenoid 142. The valve 138 is cut, on the one hand, in the pipe 134 and, on the other hand, it is connected directly to the pipe 106 by a connection 143 as well as through a pressure-regulating valve 144 which is cut in a connection 145.

In parallel relationship between the pipes 105 and 106 is connected a connection 146 that includes a two-way two-position valve 147 controlled by a solenoid 148 and a pressure-regulating valve 149.

Figure 8:
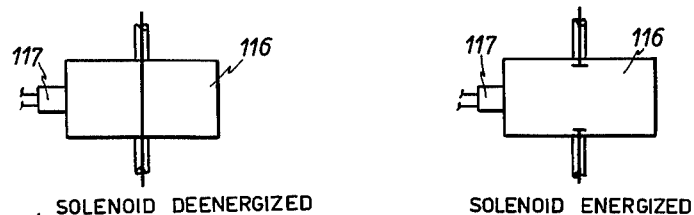
Figure 9:
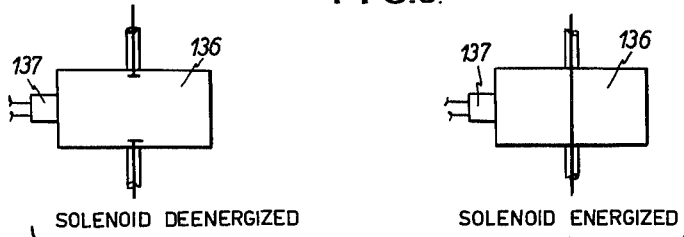
Figure 10:
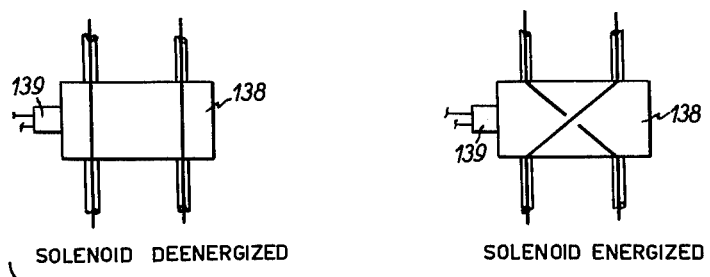
Figure 13:
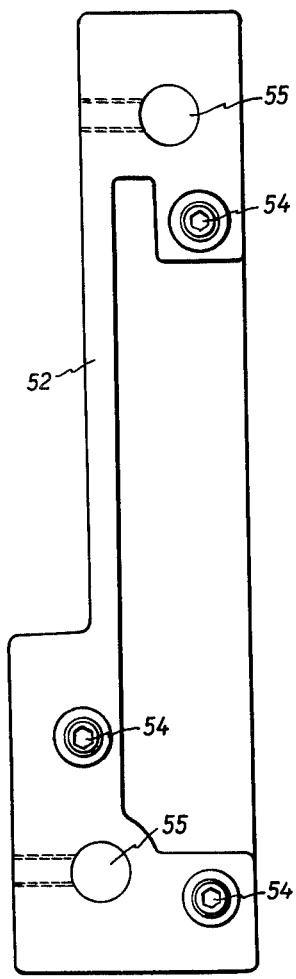
FIGURE 13 is a elevation view of the plate along line XIII—XIII of FIG. 12, the transmitter being removed.
Figure 12:
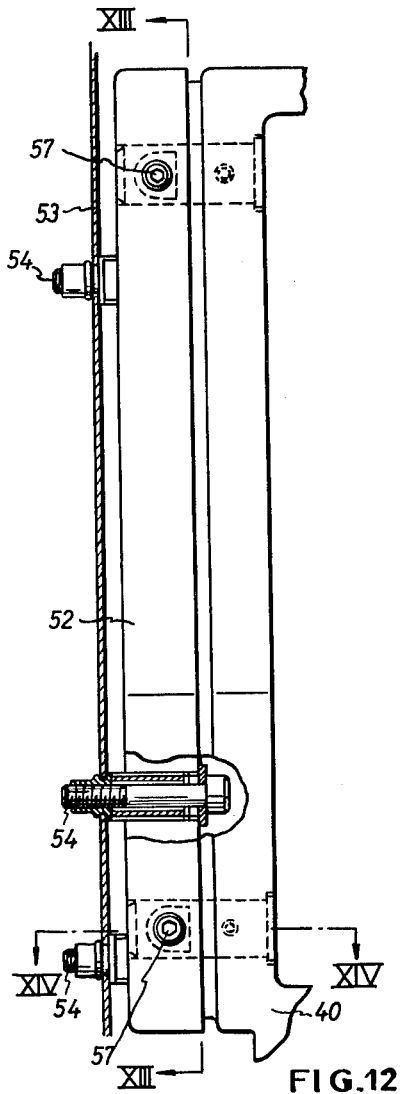
FIGURE 12 is an elevation view with parts broken away, of the securing means for the transmitter.
Figure 14:
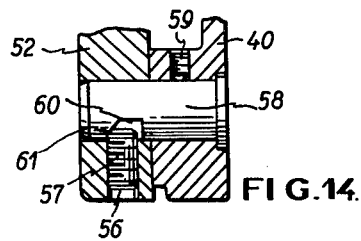
FIGURE 14 is a section view, along line XIV—XIV of FIG. 12.

The connecting between the ways of the valves 116, 126 and 129 depending on whether their solenoid is energized or not is shown in FIG. 8, while the connecting for the valve 136, 141 and 147 is shown in FIGURE 9 and for valve 138 in FIG. 10.

A pressure-gauge or manometer 150 is connected at the end of each one of the pipes 119, 132. Normally closed valves 151 are located in a plurality of the above-described circuits. The purpose thereof is to cause failures in the circuits, by opening thereof under the control of the teacher.

By means of a selector described hereinafter, the pupil may cause energizing of one or of a plurality, simultaneously, of the solenoids 110, 111, 117, 127, 130, 137, 139, 142 and 148, to move the piston 121 of the cylinder 15 with a forward or backward movement, with a desired speed; depending on the solenoids chosen, the adjustment will be made by counterpressure, by reducing the pressure at the inlet or by a subtracting circuit; in such a way the pupil will become familiar with a large number of regulating modes in the hydraulic technic which is considered, as well as with a large number of valve construction types.

The table below gives the five speeds in each direction which may be obtained by means of the circuits of the diagram of FIG. 6.

| Speed | Solenoids that must be energized | |
|---|---|---|
| | Forward | Backward |
| I | 110–117–142 | 111–117–142 |
| II | 110–127–142 | 111–130–142 |
| III | 110–137–139 | 111–137–139 |
| IV | 110–137 | 111–137 |
| V | 110–148–142 | 111–148–142 |

Figure 3:
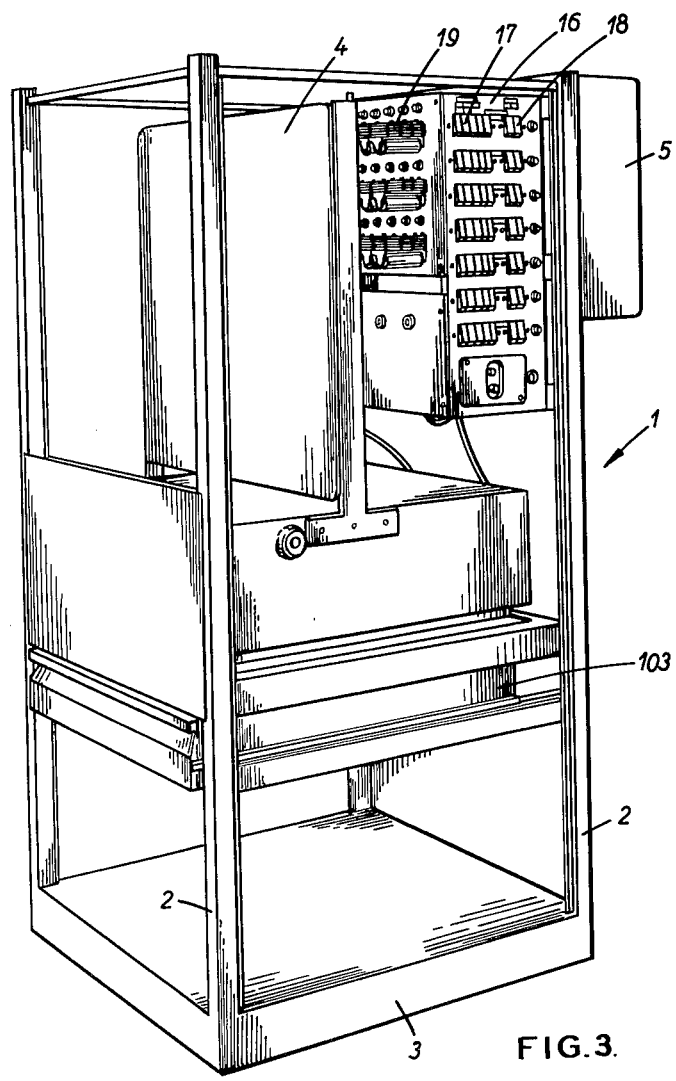
FIGURE 3 is a view in perspective of one of the sides of the apparatus of FIG. 1.
Figure 4:
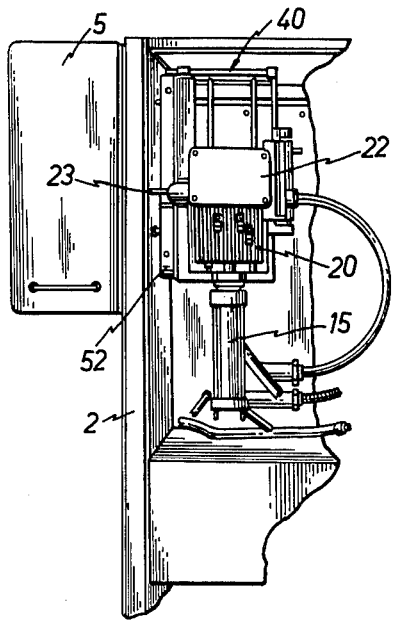
FIGURE 4 is a view in perspective of the second side of the apparatus of FIG. 1 provided with the transmitter corresponding to the hydraulic technical field.
Figure 11:
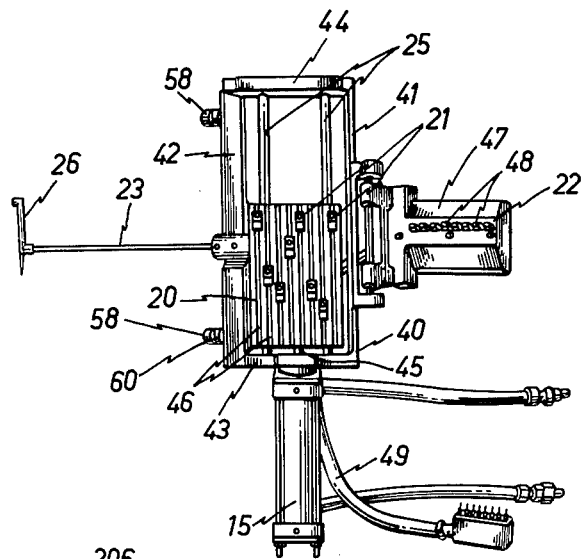
FIGURE 11 is an elevation view on an enlarged scale, of the transmitter corresponding to the hydraulic technical field.

The apparatus also comprises a selector 16 FIG. 3, which enables the pupil to select for each basic technique the operating means which is most suitable to the movement to be executed and also to control the direction of the movement for each sequence of the cycle. Thus in the case of hydraulics, the pupil will be able for each movement to select by means of the selector 16 the solenoid which brings into circuit the throttle valve which appears to him to be most suitable for the movement to be produced and he will be able to select the direction of operation by operating the valve 109 in the desired direction. In the particular embodiment described, the selector 16 comprises seven rows S.P.D.T. switches, each row comprising five S.P.D.T. switches 17 corresponding to the five combinations of the speedtable and two S.P.D.T. switches 18, corresponding to the solenoids 110 and 111, one for forward movement and the other for reverse movement, causing the electric valve 109, 116, 126, 129, 136, 139, 141, 147, to operate in the desired direction. As there are seven rows of S.P.D.T. switches, with the selector illustrated it will be possible to perform seven successive movements, if desired including idle periods the duration of which is controlled by a time switch 29 mounted on the front wall of the apparatus. The number of S.P.D.T. switches 17 can be greater or smaller than five, depending on the number of electric valves and it is possible to have more or less than seven rows of S.P.D.T. switches.

The selector 16 transmits the orders to the electric valves and other accessories through the medium of electric relays 19 or any other systems, and which will be examined in more detail hereinafter.

With the aid of the selector 16 the pupil has so far been able to select for each movement to be performed the direction of movement and the operating means which appears to have been most suitable in view of the speed of the movement and of the regulation method. He must also be able to control the amplitude, that is the period of each movement. This will be done by means of instruction or transmitter 40 (FIGURES 4, 11 to 14). It has already been explained that the piston 121 of the hydraulic cylinder 15 can be moved in either direction. This cylinder is secured underneath a frame comprised of uprights 41, 42 and cross-bars 43, 44. The piston rod 45 passes freely through the lower cross-bar 43 of the frame and carries a plate 20 having slots 46 in which stops 21 can be locked at desired levels. The plate moves vertically along guides 25 extending across the frame between the cross-bars. On the upright 41 is pivotally mounted a door 47 in which is arranged an apparatus 22 having a series of switches 48; a bolt 50 is provided for locking the door 47 on the pin 51.

The transmitter 40 is supported removably by a plate 52. This plate 52 is attached to the front wall 53 of the apparatus by means of bolts 54. The plate 52 is provided with two openings 55 inside each one of which ends a threaded side bore 56 in which is located a screw 57. The transmitter bears two projecting lugs 58 which are retained by a clamping screw 59, the lugs being provided with an opening 60 with a slanting face 61 and into which enters a screw 57.

To change the transmitter, one only has to slightly unscrew the screws 56, to pull toward oneself the transmitter, the lugs 58 of which slide inside the openings 55, to engage the second transmitter by its lugs into said openings 55 and to lock the transmitter by tightening the screws 57.

Switches 48 are connected by a cable 49, in electrical circuits corresponding, as will be described with more detail hereinafter with reference to FIGS. 15 to 17, to a first series of electric relays having contacts inserted in the electric circuits of a second series of relays 19, said last electric circuits being preselected by the S.P.D.T. switches 48, of the selector 16; the relays of said second series have contacts inserted in the electric circuits of the solenoids. The switches 48 are closed by said stops 21, in such a manner that when a switch 48 is closed, it closes a corresponding relay circuit of the first series, the contact of which on one hand opens the circuit of the first series relay corresponding to the preceding movement and on the other hand closes the circuit of that second series relay which has been preselected for the next movement by the selector 16.

For each movement the position of the stop 21 will be adjusted on the plate 20 to correspond to the desired amplitude of this movement, or if desired to an idle period. Thus the stops 21 in cooperation with the apparatus 22 constitute movement limits, effect at the desired moment the stopping of the movement corresponding to each step and sequencing of the movement corresponding to the next step. To the plate 20 is secured a spindle 23 which extends out the front of the apparatus through a recess 50 provided in the upright 42 of the frame 40 and through a vertical slot 24 provided in the frontal wall 53 of the apparatus and is coupled to a stylus device 26 which, moving vertically in front of a graph paper 27 adapted to move horizontally, traces thereon a graph 28 corresponding to the various movements selected and executed. This graph paper is mounted in the control or visual display means 5 (FIGURE 1) which is easily fitted to and removed from the remainder of the apparatus. This visual display means 5 comprises a vertical scale 40 making it possible to appreciate on the graph paper the exact amplitude of the various movements.

Figure 15:
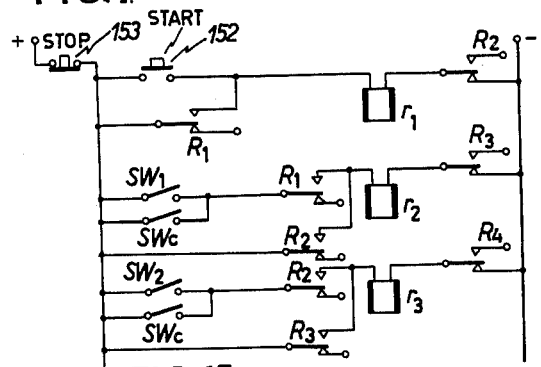
FIGURES 15 to 17 show electric schemes forming part of the instructional apparatus of FIG. 1.
Figure 5:
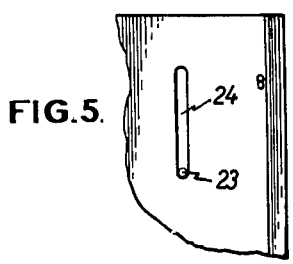
FIG. 5 shows a constructional detail of FIG. 4 on an enlarged scale.
Figure 17:
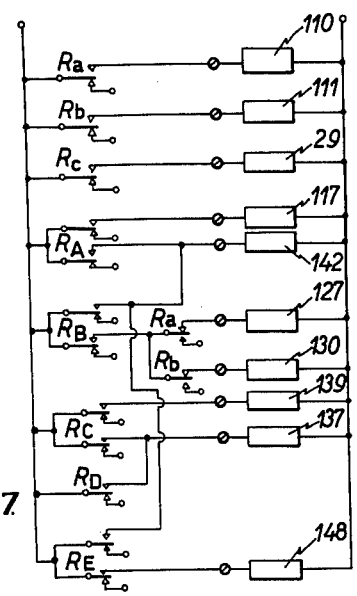
Figure 16:
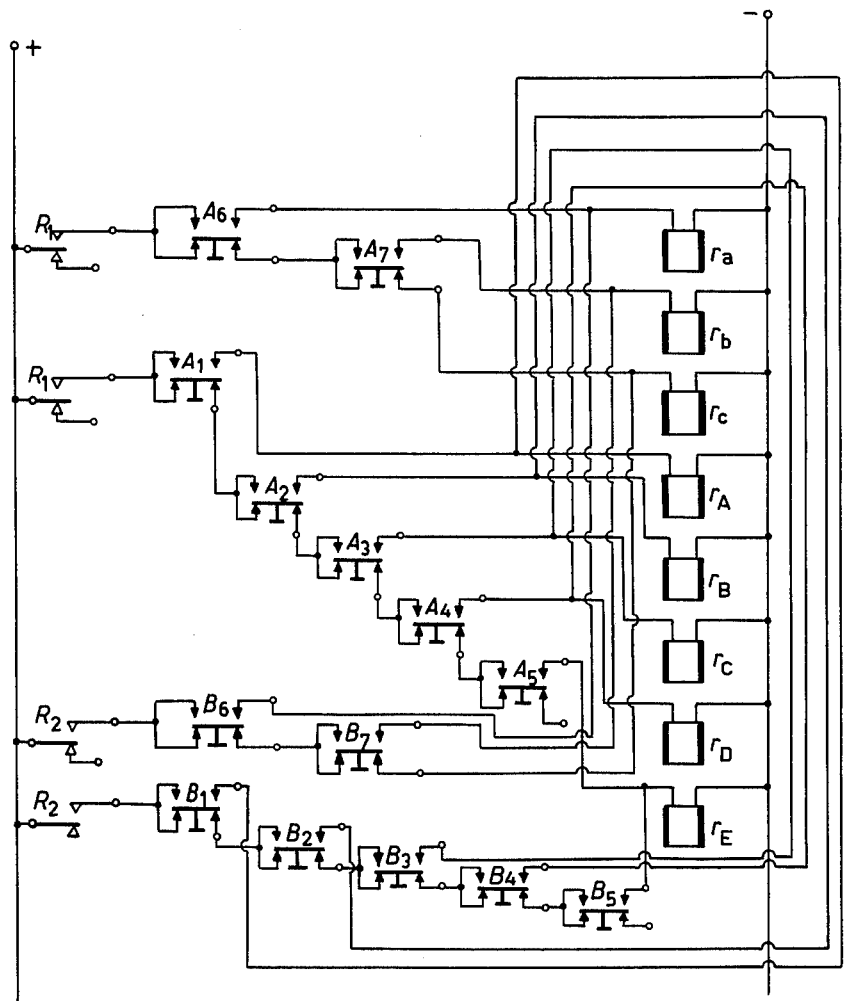

The diagram of the FIGURES 15 to 17 show circuit diagrams of the most important electric parts of the apparatus. The switches 48 of the apparatus 22 have been indicated by references SW1, SW2, etc., the relays of the first series have been indicated by references $r_1$, $r_2$, etc., while the corresponding contacts are indicated by $R_1$, $R_2$, etc. The relays of the second series have been indicated by references $r_a$, $r_b$, $r_c$ and $r_A$, $r_B$, $r_C$, etc. The S.P.D.T. (single-pole-double-throw switches of the selector 16 have been indicated by references $A_6$, $A_7$ and $A_1$ to $A_5$. The rectangles of FIGURE 17 correspond to the solenoids of corresponding reference numbers of FIG. 6 and to the time switch 29.

In operation, when the pupil, after closing the selected S.P.D.T. switches in the selected rows of the selector 16 and after adjustment of the stops 21 on the plate 20, presses the start push-button 152 mounted on the front of the apparatus, the circuit of relay $r_1$ (FIG. 15) is closed and remains closed through maintenance contacts $R_1$. As results from FIG. 16, further contacts $R_1$ will close two circuits preselected by the S.P.D.T. switches in the first row thereof. For example if S.P.D.T. switches $A_6$ and $A_4$ have been closed, the relay $r_a$ and the relay $r_d$ will be excited. The relays excited (for example $r_a$ and $r_d$) in this manner will cause through action of their contacts (see FIG. 17) closing of the circuits corresponding to the solenoids 110 and 137 and the first movement of the piston rod begins with the fourth speed to that moment when a stop of plate 20 closes the switch SW1, which causes exciting of the relay $r_2$. Then normally closed contact $R_2$ opens the circuit of relay $r_1$, which in turn causes stopping the movement and normally open contacts $R_2$ will on one hand assume maintenance of the circuit of the relay $r_2$ (FIG. 15) and closing of the two circuits preselected by the S.P.D.T. switches in the second row thereof. In turn, relays excited through the series $r_a$, $r_b$ and $r_A$ ... $r_E$ will cause exciting of the corresponding solenoids and the second movement of the piston rod begins to that moment when a stop of plate 20 closes the switch SW2; then the second movement ends and the third will begin in the manner described above. The circuits for relays $r_4$, etc., have not been represented as they are similar to the ones represented.

If in a row of the selector no S.P.D.T. switch has been closed, the result will be that the relay $r_c$ (FIG. 16) will be closed and that the time switch 29 will be excited (FIG. 17). The piston rod will be stopped until said time switch closes contacts indicated by reference $SW_c$ which are connected in parallel with the switches SW1, SW2, etc.; one only of said switches $SW_c$ cause closing of the circuit of one of the relays $r_1$, $r_2$, etc., that is that circuit in which are present the normally open contacts which are then closed of one of the relays $r_1$, $r_2$, etc., corresponding to the sequence in which the time switch acts. It must be understood that the time switch is of the type having automatically-acting return means.

One practical example of the utilization of the apparatus according to the invention will be given with reference to FIG. 18; this example will make it possible to show even more clearly the object and advantage of the selector.

Figure 18:
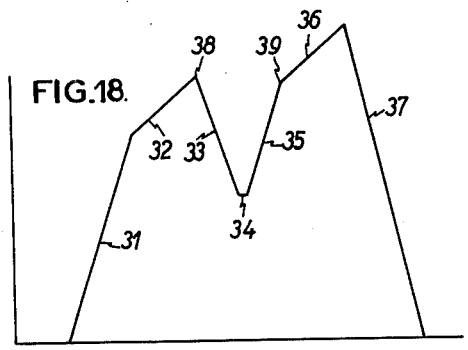
FIGURE 18 is a graph showing the visual reproduction of a sequence of movements carried out by the driven member of the apparatus of FIG. 1.

The graph in FIGURE 18 may correspond to drilling work, the various lines corresponding to the following:

31: approach of the tool (high but regulated speed)
32: drilling (slower speed)

33: withdrawal of the tool (medium speed)
34: idle period
35: approach of the tool (high speed as 31)
36: drilling (speed as 32)
37: withdrawal, end of work (high but regulated speed).

The point 38 corresponds to the end of the first drilling pass, while the point 39 corresponds to the end of the new approach 35 of the tool, this approach at high speed having to terminate before the tool comes into contact with the material for the second drilling pass.

The graph in question is given to a pupil to enable him to adjust the apparatus in such a manner that it executes the required drilling work, that is to say that the pen 26 reproduces on the graph paper 27 the same graph as that shown in FIGURE 18. By means of the selector 16 (FIGURE 3) the pupil will select the particular operating means and the direction of movement. Thus for the line 31, he will depress one of the five S.P.D.T. switches 17 of the first row, corresponding to the throttle valve which he has selected, and he will depress the S.P.D.T. switch 17 which corresponds to forward running. For the line 34, idling period, no S.P.D.T. switch of the fourth row will be operated, the idling period being adjusted by means of the time switch 29. For corresponding movements, for example the approaches 31 and 35, the pupil may select the same throttle valves. Having thus operated the desired S.P.D.T. switches of the selector 16, the pupil may adjust the speeds by adjusting the selected throttle valve. He will then adjust the stops 21 of the instruction unit in accordance with the amplitudes of the various movements 31, 32, etc. He will then be able to start the apparatus by pressing the start switch 152. The pupil's graph appearing on the visual display means 5 will enable him to see whether his adjustments make it possible to reproduce the graph shown in FIG. 18 or to judge the corrections to be made, if he has made an incorrect choice of any of the operating means, or of an incorrect movement distance, an incorrect speed, and so on. If a failure has been created by the teacher, by opening of one of the valves 151, so that the graph is no longer obtained correctly, the pupil must determine the reason for this breakdown, all this being continued until he reproduces on the visual display means 5 the graph which had been submitted to him. 153 is a stop switch to enable the pupil to interrupt the cycle if necessary.

The selector used in the apparatus of the invention does not correspond to the selectors currently used in certain machines. The selectors provided on such machines are connected once and for all in such a manner as to effect the execution of a movement or a task, in all cases by the selected operating means which will obviously be the best. The connections of the selectors are fixed and the choice is always the same for a given task. In the case of the present apparatus the selector makes it possible to choose for each movement a plurality of operating means, including operating means which are not suitable. There is therefore nothing fixed, this selector being at the disposal of the pupil who uses it according to his judgment, that is to say correctly or incorrectly, the visual display means indicating to him whether his choice is correct or incorrect.

The generator or transmitter is interchangeable, as well as panel 4, according to the technics used. Thus in FIGS. 19 to 22 has been shown an apparatus which is similar to the one described above but in which the panel 204 and the generator correspond to the technics of electricity.

Figure 20:
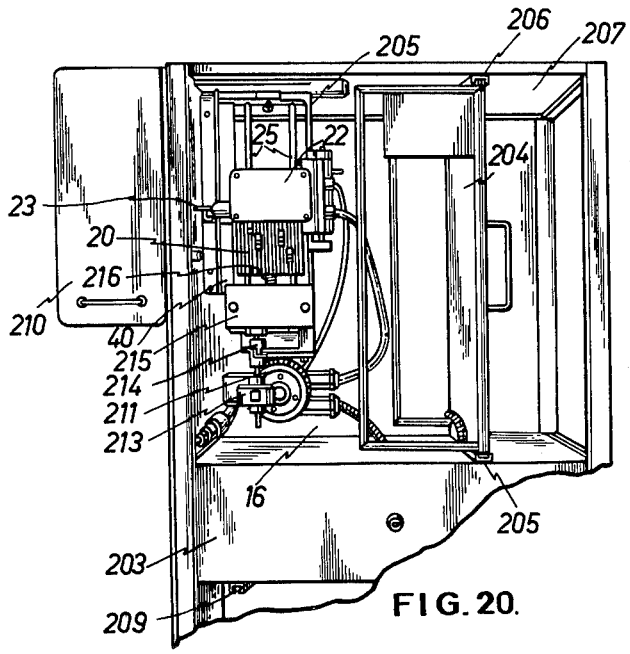
FIGURE 20 is a view in perspective of the side of the apparatus of FIG. 19, where appears the transmitter.
Figure 19:
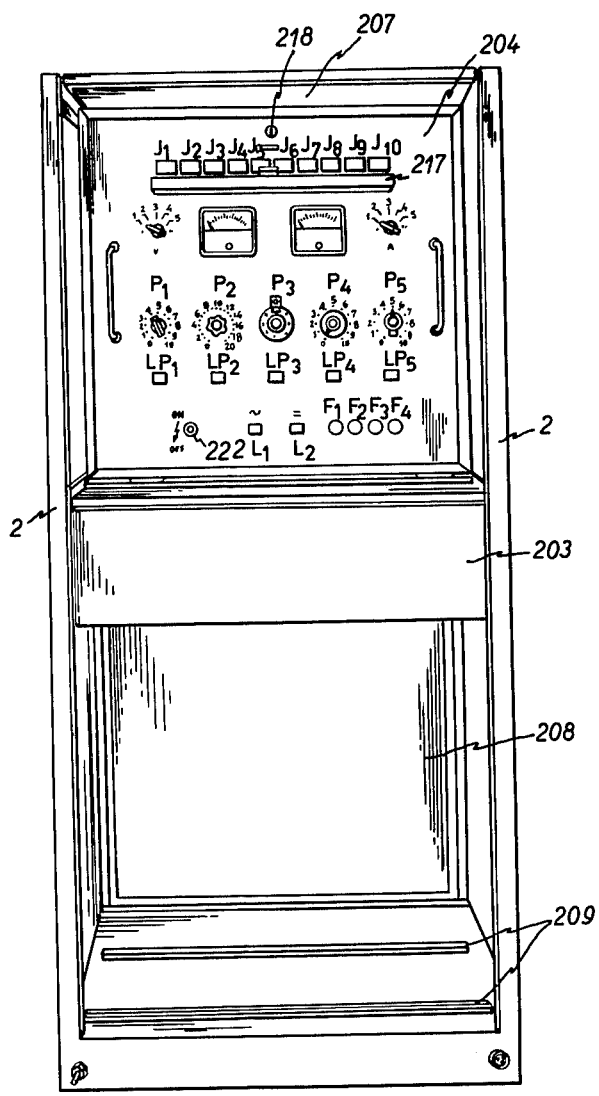
FIGURE 19 is a view in perspective of the back of a slightly modified embodiment of the instructional apparatus of FIG. 1, provided with a panel corresponding to the electrical field.

The frame of the apparatus shown in FIGS. 19 and 20 is slightly different from the one shown in FIGS. 1 to 4 mainly due to the fact that the panel 204 which is used is particularly arranged in two rails, a lower rail 205 and an upper rail 206, which are supported by an upper plate 207, while the panels for the other technics are stored in the lower part 208 of the apparatus and they are also maintained in lower and upper rails 209. At 203 has been shown a drawer similar to drawer 103, and at 216 is shown the lower wall of the selector 226 and at 210 the side wall of that face of the apparatus that bears the visualizing members.

The driving means, in this electrical embodiment, is comprised of a direct current motor 211 the speed of which is adjustable by varying the armature voltage by means of a magnetic amplifier 212 the circuit diagram of which is shown in FIG. 22. This motor 211 is attached underneath the frame 40 and the shaft thereof is connected, through a bevel gearing 213, an elastic coupling 214 and a gear box 215, to a worm 216 rotating of which causes rising or lowering of the plate 20 along the guides.

The operating circuits and members for the electricity technics will now be described in detail with reference to FIGS. 21 and 22.

The stator energizing winding 220 of motor 211 is supplied through a rectifier arrangement 221 from the A.C. network, as soon as a switch 222 powers the apparatus. The lamps $L_1$ and $L_2$ mounted on panel 204 show that network voltage is on and that the motor stator is energized. A group of five types of regulating elements of the electrical resistance for the voltage over the control coil 223 of the magnetic amplifier 212 is supplied through a transformer 224, a rectifying arrangement 225 and contacts $R_A$ to $R_E$ of the relays $r_A$ to $r_E$ which are part of the selection circuits described above with reference to FIGS. 15 and 16. These regulating members $P_1$ to $P_5$ are operating members which are under the control of the pupil. Lamps $LP_1$ to $LP_5$ are connected in parallel across the resistance regulating members $P_1$ to $P_5$. The power coils 226 and 227 of the magnetic amplifier are cut in the circuit 228, 229 that supplies the armature of motor 211 through a set of rectifiers 230, an adjusting resistor 231 and contacts $R_a$, $R_b$ of the relays $r_a$, $r_b$ controlling the motor rotating direction and which are part of the selection circuits described above with reference to FIGS. 15 and 16.

The bias coil 232 of amplifier 212 is supplied through transformer 224, a rectifying unit 225 and an adjusting resistor 233. References $F_1$ to $F_4$ designate fuses, while reference 234 designates an electrical connection and 29 designates the energizing coil of the timer, controlled by contact $R_c$ of relay $r_c$ which is part of the selection circuits described above with reference to FIGS. 15 to 17.

$I_1$ to $I_{10}$ designate panel switches which are mounted on panel 204 and which are normally hidden by a cover 217 which is locked by a lock 218. These switches which are equivalent to the valves 151 for the hydraulic technics, are operated by the teacher to cause failures in the circuits so as to give the pupil practise in trouble-shooting.

Panel 204 also comprises two ammeters and two voltmeters with multiple connections.

The invention offers great advantages for teaching: the study of programming and automation, the study of the properties and defects of the various operating means of each of the basic technics, the execution of a large number of sequence with a minimum of operating means, the teaching of a large number of different circuits, the simulation of many different machines or automatic installations for any industry, all this being achieved with simple and essentially instructive apparatus at a price which makes them available for teaching purposes.

The invention is not limited to the details given, various modifications being possible without departing from the scope of the invention.

I claim:

1. An instructional apparatus for studying the automation of a sequence of movements of a member, comprising a driving means for said member, a support chosen through a series of supports each one corresponding to one technical field, a plurality of operating circuits on said supports, operating means in said operating circuits for controlling the speed and the direction of movements of said driving means, control circuits for said operating means, a selector having a series of groups of selecting means to be operated by the pupil, means responsive to said selective means in said control circuits, an element accompanying the movement of said driven member, a series of stop means to be adjusted by the pupil on said element for controlling the driving periods of said driving means, instruction means to be actuated by said stop means, means responsive to said instruction means in said control circuits whereby upon actuating of an instruction means by said stop means, one control circuit is open and a following control circuit, which is preselected by said selecting means, is closed, and visual display indicating means accompanying the movement of said driven member.

2. An instructional apparatus for studying the automation of a sequence of movements of a member, comprising a driving means for said member, a frame, a support chosen through a series of supports each one corresponding to one technical field, a plurality of operating circuits on said support, operating means in said operating circuits for controlling the speed and the direction of movements of said driving means, control circuits for said operating means, means for securing removably said support in said frame, a selector mounted in said frame, said selector having a series of groups of selecting means to be operated by the pupil, means responsive to said selective means in said control circuits, a transmitter, means for securing removably said transmitter to said frame, said transmitter having said driving means for said member secured thereto, an element accompanying the movement of the mobile part of said driving means provided in said transmitter, a series of stop means on said transmitter to be adjusted by the pupil for controlling the driving periods of said driving means provided on said element, instruction means to be actuated by said stop means, means responsive to said instruction means in said control circuits whereby upon actuating of an instruction means by said stop means, one control circuit is open and a following control circuit, which is preselected by said selecting means, is closed, and visual display indicating means accompanying the movement of said driven member.

3. An instructional apparatus for studying the automation of a sequence of movements of a member comprising a driving means for said member, a frame, a support chosen through a series of supports each one corresponding to one technical field, a plurality of operating circuits on said support, operating means in said operating circuits for controlling the speed and the direction of movements of said driving means, electric control circuits for said operating means, means for removably securing said support in said frame, a selector mounted in said frame, a transmitter, means for securing removably said transmitter to said frame, said member being movably supported in said transmitter, said driving means for said member being secured to said transmitter, a series of stops on said transmitter to be adjusted by the pupil for controlling the driving periods of said driving means being provided on said member, a part provided on the path of said member, instruction switches mounted on said part, said switches being responsive to said stop, said selector comprising S.P.D.T. switches arranged in rows and columns, said S.P.D.T. switches to be operated by the pupil, said selector further comprising three groups of electric circuits, a first group connected by means of a removable connection to said instruction switch supporting part, instruction relays cut in the circuits of said first group, said instruction relays being responsive to said instruction switches, a second group of circuits in which are inserted the contacts of said instruction relays, said S.P.D.T. switches and selection relays, said selection relays being responsive to the actuation of said S.P.D.T. switches, and a third group of electric circuits connected by means of a removable connection to said electric control circuits for said operating means, the circuits of said third group comprising contacts of the selection relays, and a visual display indicating means secured to said member.

4. An instructional apparatus as claimed in claim 1, wherein said operating means in various operating circuits comprise devices of different constructional character.

5. An instructional apparatus as claimed in claim 1 wherein failure causing means are provided in said operating circuits, said means being at the disposal of the teacher.

6. An instructional apparatus according to claim 3, in which said third groups of electric circuits comprises solenoid means responsive to actuation of said selection relays for actuating said operating means.

References Cited by the Examiner

UNITED STATES PATENTS

| | | | |
|---|---|---|---|
| 2,802,483 | 8/1957 | Davis | 138—554 |
| 2,934,938 | 5/1960 | Rhoades | 91—1 |
| 2,999,482 | 9/1961 | Bower | 91—31 |

EUGENE R. CAPOZIO, *Primary Examiner.*

LAWRENCE CHARLES, *Examiner.*

SHELDON M. BENDER, *Assistant Examiner.*